I. SENSINI.
INTERNAL VALVE GEAR IN STEAM ENGINES.
APPLICATION FILED JUNE 3, 1913.

1,220,013.

Patented Mar. 20, 1917.
6 SHEETS—SHEET 1.

Witnesses:

Inventor:
Ivo Sensini
by B. Singer
Attorney

I. SENSINI.
INTERNAL VALVE GEAR IN STEAM ENGINES.
APPLICATION FILED JUNE 3, 1913.

1,220,013.

Patented Mar. 20, 1917.
6 SHEETS—SHEET 2.

Witnesses,

Inventor
Ivo Sensini
Attorney

I. SENSINI.
INTERNAL VALVE GEAR IN STEAM ENGINES.
APPLICATION FILED JUNE 3, 1913.

1,220,013. Patented Mar. 20, 1917.
6 SHEETS—SHEET 4.

I. SENSINI.
INTERNAL VALVE GEAR IN STEAM ENGINES.
APPLICATION FILED JUNE 3, 1913.

1,220,013.

Patented Mar. 20, 1917.
6 SHEETS—SHEET 5.

Witnesses

Inventor
Ivo Sensini
Attorney

UNITED STATES PATENT OFFICE.

IVO SENSINI, OF VICENZA, ITALY.

INTERNAL VALVE-GEAR IN STEAM-ENGINES.

1,220,013.

Specification of Letters Patent.

Patented Mar. 20, 1917.

Application filed June 3, 1913. Serial No. 771,484.

*To all whom it may concern:*

Be it known that I, Ivo SENSINI, a subject of the King of Italy, residing at Vicenza, Corso Porta Padova, Italy, have invented certain new and useful Improvements in Internal Valve-Gears in Steam-Engines, of which the following is a specification.

The object of the present invention resides in the provision of a valve chest provided with a differential piston and piston valve in which it is possible to utilize steam ports of different sizes. A further object of the invention is the provision of an auxiliary steam port for positioning the differential piston before forcing steam into the piston valve. A still further object of the present invention is to reduce the angle of advance after the starting of the locomotive.

With these and other objects in view the invention consists of the improvements hereinafter described and finally claimed.

The nature, characteristic features and scope of the invention will be more fully understood from the following description taken in connection with the accompanying drawings forming part hereof and in which.

Figure 1:
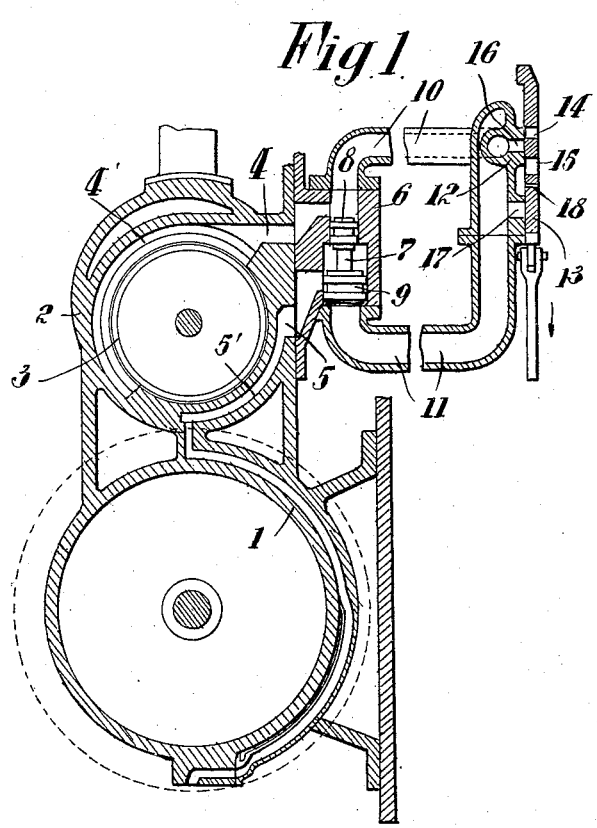
Figure 1 is a vertical sectional view of a locomotive steam cylinder and the piston valve.
Figure 2:
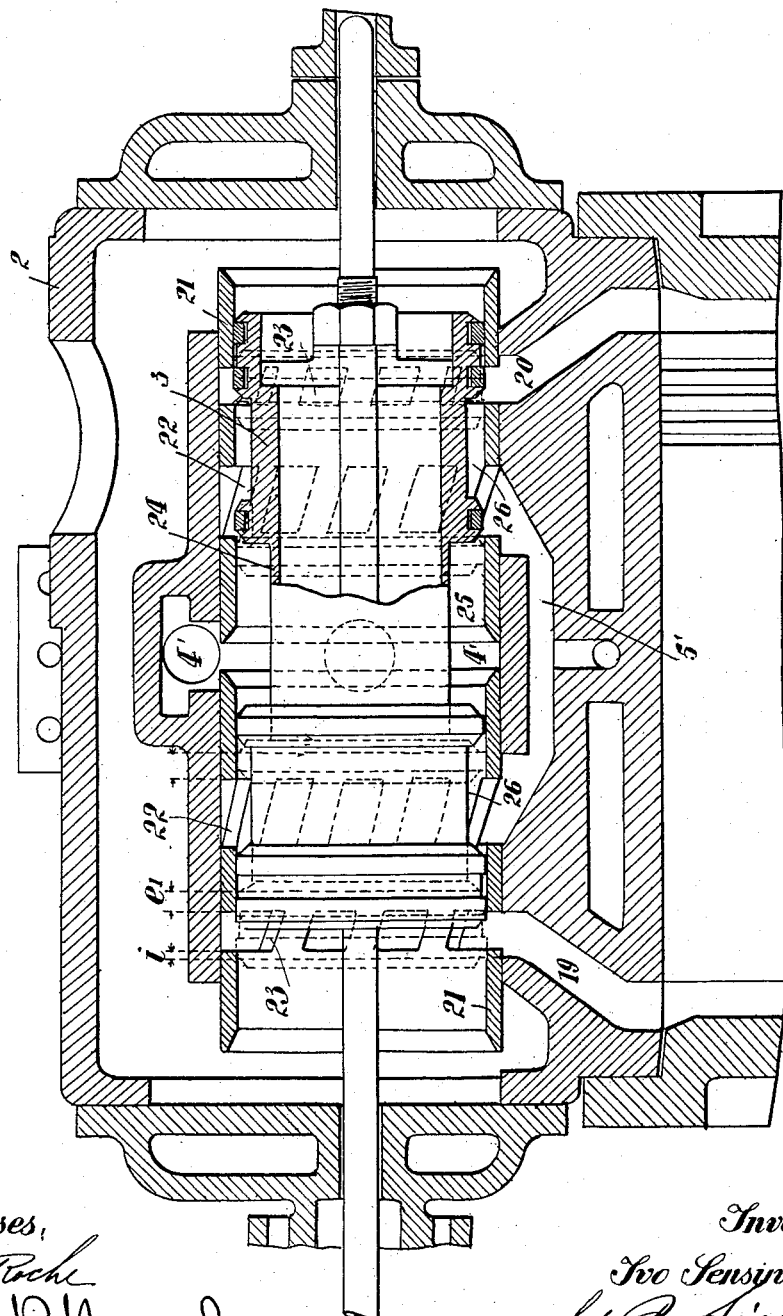
Fig. 2 is a longitudinal sectional view of the piston valve.

Referring to the drawings and particularly to Figs. 1 and 2, I have there shown a steam cylinder 1, a valve casing 2 having its sides integral therewith and provided with a piston valve 3 which is connected to two main inlets 4 and 5 by means of semi-circular channels 4′ and 5′ respectively. A casing 6 is secured to the valve casing 2, adjacent the inlets 4 and 5 and is provided with two steam inlets 10 and 11 which are a continuation of inlets 4 and 5 respectively. A differential piston 7 is positioned intermediate the inlets 4 and 10 and 5 and 11, said piston 7 is provided adjacent its end with two pistons 8 and 9 adapted to close inlets 4—10 or 5—11 as will hereinafter be more fully described. The inlets 10 and 11 terminate in apertures 16 and 17 respectively. A sliding valve 13 is secured to the casing 6 and provided with ports 14 and 15 adapted to be brought into register with apertures 16 and 17 respectively. A small port 18 is provided for said valve and serves to inject sufficient steam into the aperture 17 and inlet 11, to raise the differential valve before the port 15 is positioned in register with the aperture 17, so that the steam will flow directly into the inlet 5, circular channel 5′ and thence into the steam cylinder. The preceding arrangement is carried out when starting a locomotive, but after the same has started, the sliding valve is shifted so that the port 14 will register with aperture 16. The steam will enter the piston valve through inlet 4 and enter the steam cylinder through medium of circular channel 4′.

The casing 2 communicates with the steam cylinder 1 through medium of steam passages 19 and 20 formed adjacent the ends thereof.

Referring particularly to Fig. 2, I have there shown the flow of steam from the steam inlets to steam passages 19 and 20. An annular cast-iron liner 21 is fitted within the casing 2 and provided with a series of annularly disposed apertures 22, and 23. The apertures 22 are larger in cross-sectional area than the apertures 23, the purpose of which will hereafter more fully appear. Ports 26 are formed in the liner 21 and serve to provide a channel between apertures 22 and channel 5″. A central annular chamber 25 is positioned to receive steam from circular channel 4′, the purpose of which will hereinafter more fully appear. Small lap $e^1$ is provided for said liner 21 and larger lap $e^1$ is provided for said liner 21 adjacent passage 20, $i$ constituting a small lap on liner 21 adjacent passage 19.

The operation of the piston valve is as follows:

The sliding valve 13 is forced downward and the port 18 positioned in register with aperture 17, the steam flowing through aperture 17 raises the piston 9 secured to differential piston 7 and keeps it in a raised position until the port 15 registers with the aperture 17 and the main flow of steam flows through the inlet 15—5 and circular channel 5′. The port 26 forms a direct passage between channel 5′ and passage 20, the steam flows into the steam cylinder and forces the piston to travel longitudinally therein. The liner being actuated in the usual manner by the longitudinal movement of the steam cylinder piston, the passage 20 is closed and the passage between 26 and 19 is opened, allowing steam to enter the steam cylinder through passage 19 and return the cylinder piston to its original position. On the return of the steam piston, the opening is formed between passage 20 and apertures 23 allowing exhaust steam to escape through the head of liner 21 and the exhaust located in the top of casing 2. When the steam enters the steam cylinder through passage 20, an opening is formed between passage 19 and apertures 23, allowing the exhaust steam to escape through the opposite head of liner 21 and the exhaust formed at the top of casing 2.

When the locomotive has started and is running free, the sliding valve is shifted through medium of a lever arrangement not shown so as to bring port 14 into register with aperture 16, inlets 10—4 and circular channel 4'. The steam will flow into chamber 25, and thence through port 26 into apertures 22 and 23 and into passage 19 or 20 depending upon the portion of the piston in the steam cylinder. The steam would escape to the exhaust in the same manner as described in the foregoing paragraph. The object of utilizing the channel 4' and smaller apertures 23 is that less steam is required to operate a locomotive when running free, than when starting the locomotive.

Figure 3:
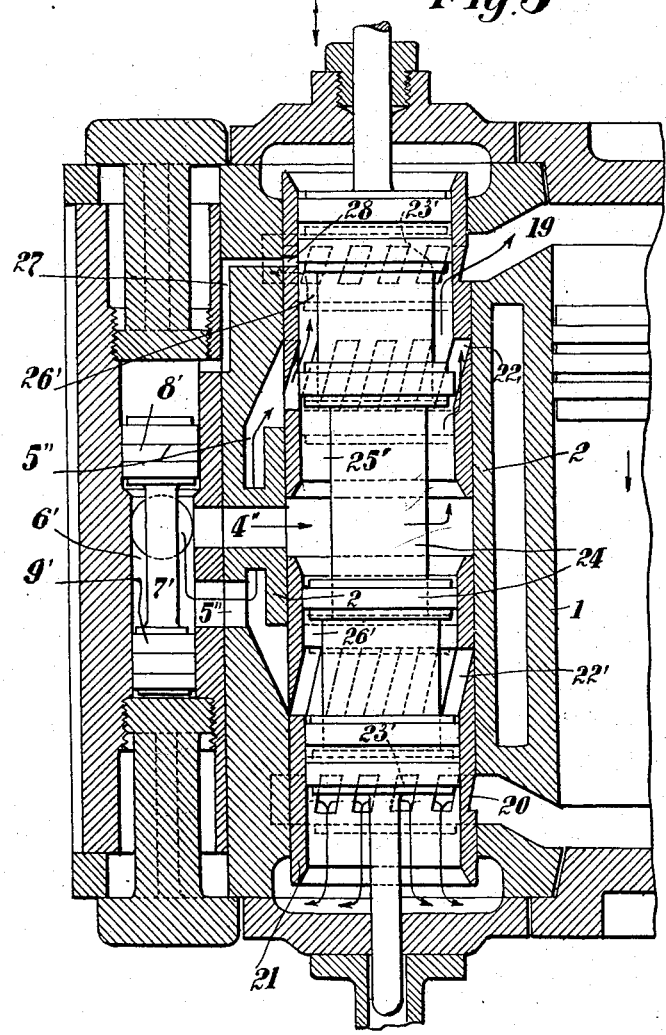
Figs. 3 and 4 show views similar to Figs. 1 and 2 applied to stationary engines.
Figure 4:
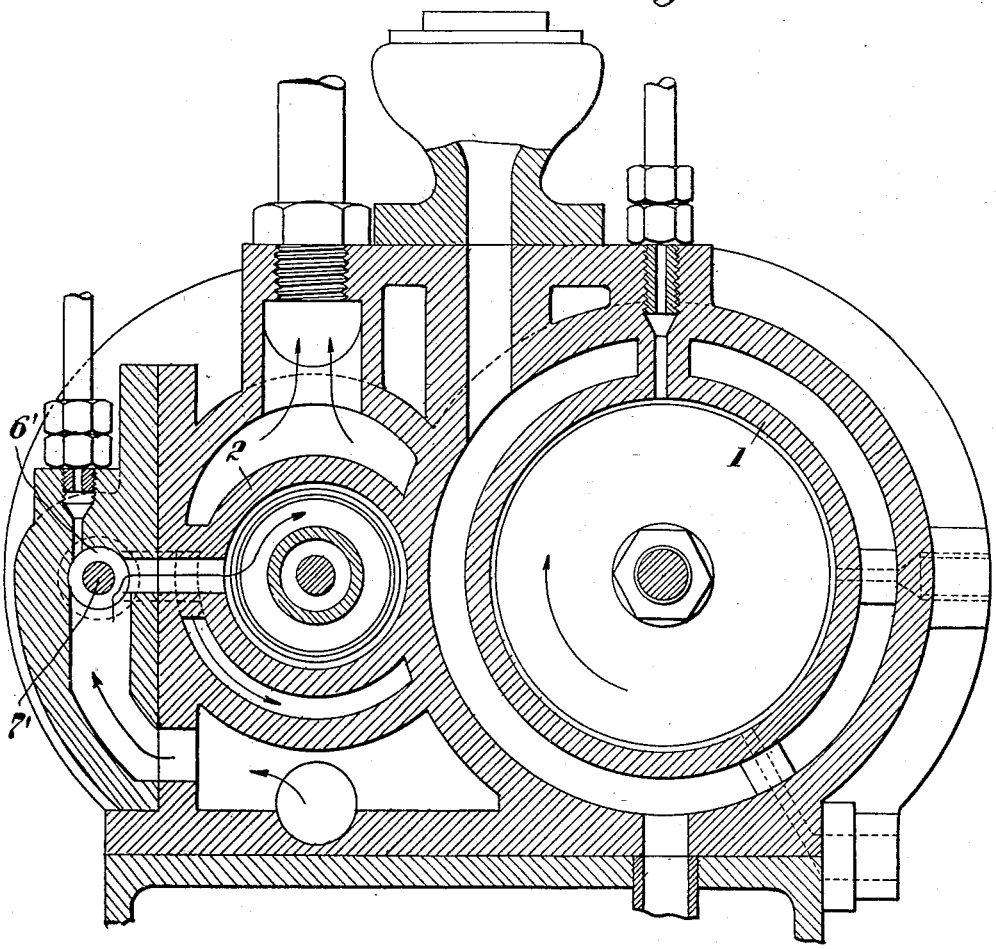

Referring to Figs. 3 and 4 I have there shown a construction similar to Figs. 1 and 2. The steam enters the chamber 6' which contains the pistons 8' and 9' connected by the connected rod 7'. The piston 8' has a larger cross-sectional area than the piston 9'. When the engine is started, the piston 8' having a larger working surface is actuated, so that the piston 9' covers the channel 5'', thereby allowing steam to flow through channel 4'', 25, openings 22 and from there through inlets 19 or 20 into the steam cylinder. As the engine increases its speed the valve is actuated until 23' registers with the small steam channel 27, which leads to the piston 8'. The steam entering the steam channel 28—27 forces the piston 8' and its complemental piston 9' downward, thereby uncovering the channel 5'' and allowing a greater flow of steam to enter the chamber 25' and inlets 19—20.

Figure 5:
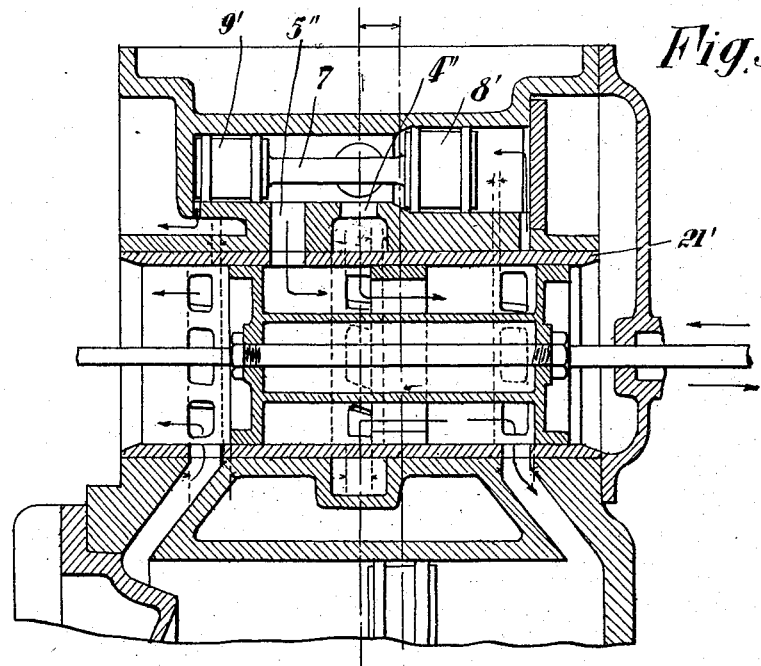
Figs. 5 and 6 are longitudinal central sectional views showing modified forms of the piston valve.
Figure 6:
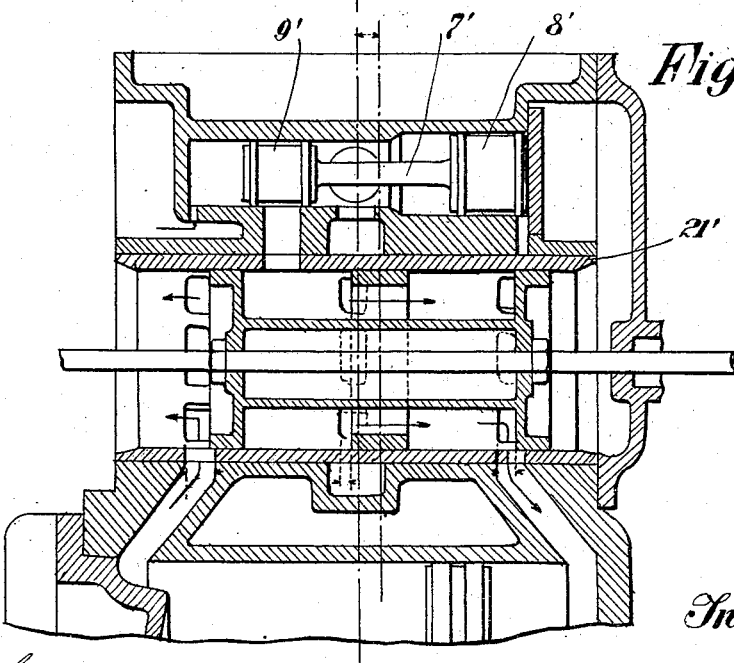
Figure 7:
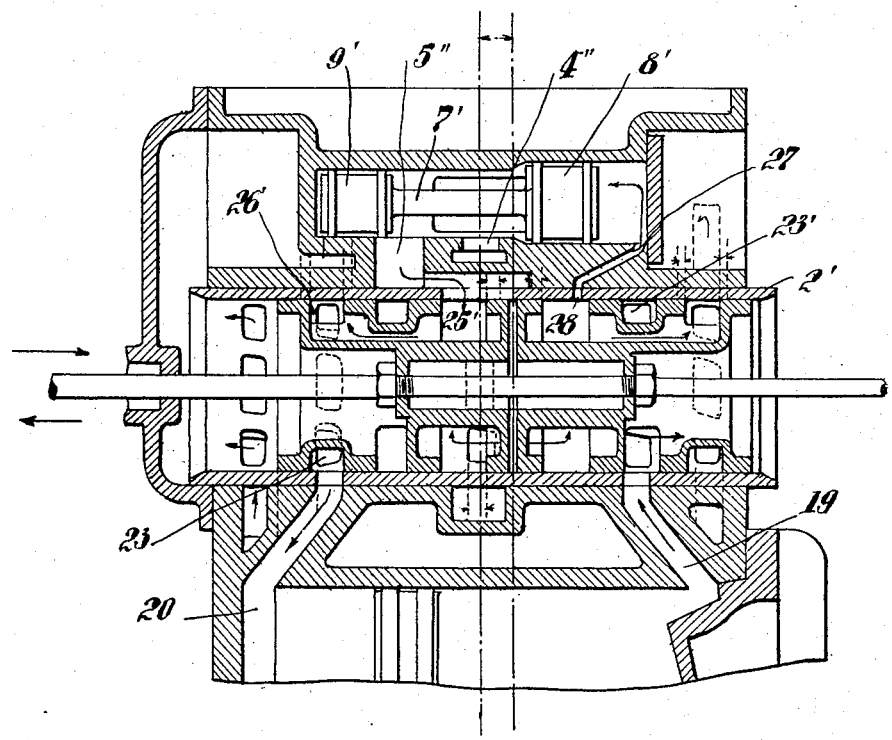
Fig. 7 is a view through central cross-section of a double port piston valve.

Referring to Figs. 5 and 6 I have there shown views of a modified form of the invention. The operation of the valves and pistons is identical with those shown in Figs. 3 and 4. In Fig. 5 steam can flow simultaneously through inlets 4'' and 5'', while in Fig. 6, steam can flow only into inlet 5''. The operation of the pistons is identical with those employed in Figs. 3 and 4. In Fig. 7 a double ported piston valve is shown, steam entering the valve through two inlets 4'' and 5''. The steam flowing in the direction of the arrows shown in Figs. 5 and 6. The operation of the pistons 8' and 9' is identical with those employed in Figs. 3 and 4.

I claim:

1. In a valve mechanism for steam engines in combination with the main valve thereof, provided with steam inlets an auxiliary valve adapted to admit steam to said main valve, a differential piston having two separate end portions of unequal size, intermediate said inlets and normally closing one of said inlets, a slide valve adjacent said inlets, said last mentioned valve having formed therein apertures serving to provide an initial impulse of steam being followed by the normal flow of steam substantially as described.

2. A piston valve, including its complementary cylinder, a steam valve secured to said piston valve, said valves having formed therein steam inlets, a differential piston seated in said steam valve intermediate said inlets, a slide valve seated adjacent said inlets, and having formed therein an auxiliary port and being adapted to position said differential piston before the normal flow of steam, substantially as described.

3. In a piston valve of the character described, a casing, an annular liner fitted within said casing and provided with a series of undularly disposed apertures, a differential piston having two separate end portions of unequal size for alternately uncovering and covering said apertures, and means coacting with said valve for regulating the flow of the steam, substantially as described.

4. In a valve mechanism for steam engines in combination with the main valve thereof provided with steam inlets, an auxiliary valve adapted to admit steam to said main valve, a differential piston having two separate end portions of unequal size seated in said steam valve normally closing one of said inlets, a slide valve adjacent said inlets, and means coacting with said valve and liner to direct the flow of steam into said central chamber or ports, substantially as described.

In testimony whereof I have set hereunto my hand in presence of two witnesses.

IVO SENSINI. [L. S.]

Witnesses:
  JAS. VERNER LONG,
  ALEX. THAYER.